(12) United States Patent
Herrmann et al.

(10) Patent No.: US 10,099,206 B2
(45) Date of Patent: Oct. 16, 2018

(54) CATALYTICALLY ACTIVE MATERIAL, METHOD FOR PRODUCING SAME, AND USE THEREOF

(71) Applicant: SCHOTT AG, Mainz (DE)

(72) Inventors: Jochem Herrmann, Mainz (DE); Christian Henn, Frei-Laubersheim (DE); Joerg Schuhmacher, Kornwestheim (DE); Matthias Woelfinger, Kriftel (DE); Martin Muhler, Bochum (DE); Thomas Emmerich, Bochum (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/355,572

(22) Filed: Nov. 18, 2016

(65) Prior Publication Data
US 2017/0144134 A1    May 25, 2017

(30) Foreign Application Priority Data

Nov. 19, 2015    (DE) .................. 10 2015 120 061

(51) Int. Cl.
*B01J 21/06*    (2006.01)
*B01J 23/00*    (2006.01)
(Continued)

(52) U.S. Cl.
CPC .......... *B01J 23/83* (2013.01); *B01D 53/8687* (2013.01); *B01D 53/88* (2013.01); *B01J 35/0006* (2013.01);
(Continued)

(58) Field of Classification Search
CPC ...... B01J 21/063; B01J 21/066; B01J 23/002; B01J 23/10; B01J 23/83; B01J 35/0006
See application file for complete search history.

(56) References Cited

U.S. PATENT DOCUMENTS

| 3,460,523 A | 8/1969 | Stiles et al. |
| 3,993,597 A | 11/1976 | Stiles |

(Continued)

FOREIGN PATENT DOCUMENTS

| DE | 3942236 | 6/1991 |
| DE | 102005009285 | 9/2006 |

(Continued)

OTHER PUBLICATIONS

Taylor et al., "The oxidation of carbon monoxide at ambient temperature over mixed copper-silver oxide catalysts", Catalysis Today, vol. 114, 2006, pp. 357-361.

(Continued)

*Primary Examiner* — Cam N. Nguyen
(74) *Attorney, Agent, or Firm* — Ohlandt, Greeley, Ruggiero & Perle, L.L.P.

(57) ABSTRACT

A catalytically active material is provided. The material includes a mixed oxide having a first metal selected from group 4 of the periodic table of elements and/or a second metal, and at least one further metal selected from group 11 of the periodic table of elements, wherein the macroscopic composition of the material given by the chemical formula corresponds to the composition of the material at a molecular level. A coating made of such a material is also provide, as is an article having such a coating, and a method for producing such a material.

28 Claims, 2 Drawing Sheets

(51) Int. Cl.
    *B01J 23/10*     (2006.01)
    *B01J 23/83*     (2006.01)
    *B01J 35/00*     (2006.01)
    *B01J 37/04*     (2006.01)
    *B01J 37/02*     (2006.01)
    *B01J 37/34*     (2006.01)
    *B01D 53/86*     (2006.01)
    *B01D 53/88*     (2006.01)

(52) U.S. Cl.
    CPC ....... *B01J 35/0013* (2013.01); *B01J 37/0215* (2013.01); *B01J 37/04* (2013.01); *B01J 37/342* (2013.01); *B01J 37/347* (2013.01); *B01D 2255/2065* (2013.01); *B01D 2255/20707* (2013.01); *B01D 2255/20715* (2013.01); *B01D 2255/20761* (2013.01); *B01D 2255/40* (2013.01); *B01D 2255/9205* (2013.01)

(56) References Cited

U.S. PATENT DOCUMENTS

| | | | |
|---|---|---|---|
| 4,049,583 A | 9/1977 | Lauder | |
| 5,387,475 A | 2/1995 | Baresel et al. | |
| 5,902,767 A * | 5/1999 | Kresge | B01J 23/683 502/308 |
| 6,458,741 B1 * | 10/2002 | Roark | A62D 3/38 423/245.3 |
| 7,329,359 B2 * | 2/2008 | Roark | A62D 3/38 210/762 |
| 7,485,599 B2 * | 2/2009 | Muhammed | B01D 53/945 502/302 |
| 8,431,506 B2 * | 4/2013 | Neltner | B01J 23/10 502/240 |
| 8,778,831 B2 * | 7/2014 | Southward | B01D 53/944 423/239.1 |
| 8,921,256 B2 * | 12/2014 | Cizeron | B01J 23/002 502/302 |
| 9,776,162 B2 * | 10/2017 | Kumari | B01J 19/123 |
| 2008/0022992 A1 | 1/2008 | Wahl | |
| 2010/0081569 A1 | 4/2010 | Sepeur et al. | |
| 2010/0316547 A1 | 12/2010 | Justice et al. | |
| 2013/0259779 A1 | 10/2013 | Kim et al. | |
| 2014/0004323 A1 | 1/2014 | Bockmeyer et al. | |

FOREIGN PATENT DOCUMENTS

| | | |
|---|---|---|
| DE | 102007034633 | 1/2009 |
| DE | 102009010158 | 9/2010 |
| DE | 102010050771 | 5/2012 |
| DE | 102013205197 | 10/2013 |

OTHER PUBLICATIONS

Material Safety Data Sheet for Printex U, Mar. 24, 2016, 22 pages.

\* cited by examiner

CATALYTICALLY ACTIVE MATERIAL, METHOD FOR PRODUCING SAME, AND USE THEREOF

CROSS REFERENCE TO RELATED APPLICATIONS

This application claims the benefit under 35 U.S.C. 119 of German Application No. 10 2015 120 061.9 filed on Nov. 19, 2015, the entire contents of which are incorporated herein by reference.

BACKGROUND

1. Field of the Invention

The invention relates to a catalytically active material, more particularly a material which acts as an oxidation catalyst, and to a method for producing such a material, and to its use. The invention further relates to an article equipped with a catalytic highly heat-resistant coating on at least one face thereof, to improve self-cleaning.

2. Description of Related Art

Catalytic materials have been known in chemistry for many years. Special recognition have the systems employed in heterogeneous catalysis, for example in post-combustion of exhaust gases. Such systems are usually configured so that the catalytically active material is applied on the surface of an inert ceramic carrier of high porosity. Typically in this case the active catalytic materials comprise precious metals, preferably platinum, making such a component which is colloquially referred to as a "catalyst" correspondingly expensive, depending on the content of catalytically active material.

Therefore, in order to avoid high material costs, alternative materials have repeatedly been tested for their suitability for oxidative heterogeneous catalysis. Mixed oxide catalysts have become of particular importance in this context. These are mixtures of metal oxides with a basic configuration also consisting of a largely inert porous carrier with a surface on which catalytically active material is applied in dispersed form. Such mixed oxide catalysts are produced by so-called impregnation which may in principle be performed in two ways, set out below.

One option is to apply the catalytically active material on the surface of a porous oxidic carrier by a precipitation reaction. It is also possible that both materials, i.e. both the carrier material and the catalytically active material are precipitated by so-called co-precipitation in which the two materials, i.e. both the carrier material and the catalytically active material are deposited adjacent to one another. Under skillful control of the process the catalytically active material is also deposited on the surface of the inert carrier.

Furthermore it is possible as well to mix a porous carrier material with a solvent and additionally dissolve a metal salt in this solvent. Subsequently, distillation is performed such that the solvent evaporates and the metal salt which is the later active material is deposited on the carrier surface.

In both cases thermal post-treatment follows, in the form of drying and sintering, so that a mixed oxide powder is obtained. This mixed oxide powder already has the heterogeneous structure mentioned above, that means it consists of a carrier on which a layer of catalytically active material is arranged.

Such a material is exemplified in U.S. Pat. No. 3,460,523 A which discloses coatings for cooking appliances that act as oxidation catalysts. The coatings are formed as a porous film, the pores constituting at least 15 vol % of the coating. Furthermore, the coating comprises at least one alkaline silicate binder. The coating is formed by first depositing a catalytically active composition on a carrier which is made of oxides of rare earth elements, for example, e.g. manganese, cobalt, and nickel. This is followed by further thermal processes from which a catalytically active powder is resulting. The so obtained catalytic material is then added to a silicate binder which may additionally contain a filler, for example in the form of silica. Then, a coating is applied to a substrate using the coating solution prepared in this manner.

Furthermore, U.S. Pat. No. 3,993,597 A describes a further development of the aforementioned method. The catalytic composition for coating the surfaces of cooking appliances comprises first a catalytic metal oxide in this case, for example cobalt or manganese oxide, or a rare earth oxide, or mixtures of metal oxides, and furthermore at least 1 wt % of an alkali silicate and a carbonate or hydroxide of at least one catalytic metal oxide. Furthermore, the coating is porous and is deposited from a coating solution consisting of an alkaline silicate binder in which particles of a catalytically active material are dispersed.

German patent application DE 39 42 236 A1 describes a catalytic coating composition which is used for coating cooking, baking, roasting or barbeque equipment or parts thereof. Here, the catalytically active material is, e.g., an oxide of cerium, sodium, potassium, calcium, manganese, nickel, and/or cobalt or mixtures thereof, which may furthermore comprise a silicate. The catalytically active material is highly porous. It is obtained by a precipitation reaction, for example from an aqueous solution. The so obtained material may subsequently be mixed with further film-forming materials, such as an email, and may be applied as a layer, whereby again highly porous coatings are obtained in this way.

Furthermore, German Patent DE 10 2005 009 285 B3 describes a window device and its use for a diagnostic system for combustion processes. The window device in this case comprises at least one window element that comprises an oxidation catalyst material by means of which carbonaceous contaminations of the window can be decomposed. The oxidation catalyst material is selected so that the window contaminations can be decomposed at least within a temperature range from 300° C. to 450° C. The oxidation catalyst material in particular comprises a material selected from group VIIIB, preferably platinum, and is optically transparent.

German patent application DE 10 2007 034 633 A1 describes a coating material with catalytic activity and its use. The coating material is specifically active in view of reducing the combustion temperature of soot and organic substances and is composed of 20 to 90 wt % of compounds of the transition metals or of elements of main groups 3 and 4 and of 10 to 80 wt % of alkali or alkaline earth metal compounds. Additionally, the coating material may be doped with precious metals. The coating material is applied to a substrate and dried. The coating itself is therefore accomplished by a wet-chemical process, for example by conventional wet-chemical coating methods such as flooding, coating with doctor knife, dipping, rolling, printing, or similar methods. The transition elements or elements of main groups 3 and 4 of the periodic table preferably used include zirconium, titanium, aluminum, silicon, cerium, and other metals. The coating solution may be applied directly to a substrate or to a porous carrier.

Finally, German patent application DE 10 2010 050 771 A1 describes an article made of glass or glass ceramic having a high-temperature stable low-energy layer. This layer contains at least one metal oxide of hafnium, yttrium, zirconium, or cerium, or a mixture thereof as a base material, and these metal oxides are present in nanocrystalline form, at least in part. Furthermore, in addition to the first metal oxide the layer contains at least one further metal cation of any of the elements calcium, cerium, yttrium, potassium, lithium, strontium, or gadolinium. The layer produced in this manner has a low-energy surface so that it exhibits both hydrophobic and thermo-catalytic properties, the thermo-catalytic effects occurring already at a temperature of 325° C. and above.

All these materials have in common that they exhibit a number of disadvantages.

For example, with the coatings consisting of a conventional oxidation catalyst deposited on a porous material transparent coatings cannot be obtained or the catalytic activity only starts above a certain temperature, for example above 300° C. Another drawback is that for a number of catalysts precious metals such as platinum are still used.

Therefore, there is a demand for a material which is catalytically effective, especially as an oxidation catalyst, and which can be prepared in the form of a homogeneous material, which is moreover in particular suitable for transparent coatings, and which exhibits a catalytic effect starting already at low temperatures, for example below 300° C.

SUMMARY

An object of the invention is to provide a homogeneous catalytically active material which is suitable for transparent coatings as well, and which furthermore can be exposed to high thermal loads in operation, for example up to 700° C., and with catalytic activity of the material already starting at temperatures below 300° C. Another aspect of the invention relates to the preparation of such a catalytically active material and to the use thereof. According to another aspect, an object of the invention is to provide articles which have at least one transparent coating and which can be exposed to high thermal loads of up to 700° C. in operation.

The catalytically active material of the present invention is made of a mixed oxide comprising: a first metal M1 selected from group 4 of the periodic table of elements; and/or a second metal M2; and at least one further metal M3 selected from group 11 of the periodic table of elements; wherein each of the metals is present at an oxidation state greater than 0 and mixed at a molecular level so that the macroscopic composition given by the chemical formula of the material corresponds to the composition of the material at the molecular level; wherein catalytic activity of the material already occurs at temperatures below 300° C.; and wherein furthermore a ratio $V_{M,atomic}$ of the content of the metal of group 11 of the periodic table and the sum of contents of the other metals based on the atomic composition, $$V_{M,atomic} = \frac{M3}{\sum (M1 + M2)},$$

is between 1 and 1:6, preferably between 1 and 1:3.

The catalytic material of the present invention has the following advantages. Due to the mixing of the individual components on a molecular level the material is macroscopically homogeneous. Thus, no graded heterogeneous materials are obtained, but rather a homogeneous mixed oxide material which can be applied on a substrate even in form of a transparent coating, for example.

By combining the metals M1 and/or M2 with at least one further metal selected from group 11 of the periodic table of elements, the catalytic activity of the material is adjusted so that thermo-catalytic activity already starts at lower temperatures than hitherto, in particular at temperatures below 300° C. Actually, thermo-catalytic activity below 300° C. has already been known. For example, materials disclosed in U.S. Pat. No. 3,993,597 A and U.S. Pat. No. 3,460,523 A exhibit catalytic activity even already at 204° C. However, the materials produced there are heterogeneous and therefor include many scattering grain boundaries, so that so far it was not possible in this way to achieve cost-efficient transparent coatings which already have a catalytic effect below 300° C.

Such catalytic activity can be achieved in a surprisingly simple manner by an appropriate proportion of the metals relative to each other in the catalytically active material of the present invention, namely by a ratio of the metal of group 11 of the periodic table to the sum of the other metals between 1 and 1:6, preferably between 1 and 1:3, based on the atomic composition.

In the context of the present invention, catalytic activity therefore means the starting of oxidative decomposition of soot or of carbonaceous organic combustion products. Catalytic activity of the material is therefore defined as the start of oxidative decomposition of organic carbonaceous combustion products, such as soot.

Transparent catalytic coatings have been disclosed, for example, in DE 10 2010 050 771 A1 and DE 10 2005 009 285 B3. However, the thermo-catalytic activity only starts at 325° C. or at 300° C. A further disadvantage of the coating disclosed in DE 10 2005 009 285 B3 is that for producing the catalytic activity in particular platinum is used, so that the coating is expensive.

By contrast, with the catalytically active material of the present invention a cost-efficient catalyst material is provided, which may in particular be used to produce cost-efficient coatings.

According to one embodiment of the invention, the at least one first metal comprises titanium and/or zirconium.

According to a further embodiment of the invention, the second metal comprises a lanthanide, preferably cerium.

According to a further embodiment of the invention, the metal selected from group 11 of the periodic table of elements is copper.

Furthermore, according to yet another embodiment of the invention it has been found that particularly good results with respect to the oxidation of organic material, for example carbonaceous organic combustion products such as soot are obtained if the atomic ratio of the first metal to the second metal is 1:4. Therefore, the atomic ratio of the first metal to the second metal is preferably 1:4.

Moreover, the material is preferably at least in part nanocrystalline. The nanocrystalline fraction of the material is greater than 25 vol %, preferably greater than 50 vol %, and more preferably greater than 75 vol %.

Preferably, the nanocrystals or crystallites have a crystallite size from 4 to 50 nm, the crystallite size being specified as the mean diameter of the crystallites which was determined by Rietveld analysis using X-ray diffraction (XRD).

Furthermore, the material preferably has a granular structure of a form in which the nanocrystals do not have a preferred crystallographic orientation so that they are randomly distributed.

According to one embodiment of the invention, the material furthermore exhibits a temperature resistance of at least 600° C., preferably at least 700° C. This is the temperature at which degradation of the layer occurs, in which the catalytically active components, that is to say in particular the at least one metal from group 11 of the periodic table of elements, in particular copper, Cu, begins to migrate within the layer and also begins to pass into the substrate or into the gas phase, whereby the catalytic effect decreases.

The material preferably has a porosity of less than 50 vol %, preferably less than 25 vol %, and more preferably less than 15 vol %. Here, the porosity was measured by ellipsometric porosimetry.

According to yet another embodiment of the invention, at a wavelength of 589 nm the material has a refractive index from 1.7 to 2.2, preferably from 1.8 to 2.1.

The catalytically active material of the present invention may furthermore be applied as a coating. Thus, the present invention also discloses a coating made of a catalytically active material.

According to one embodiment of the invention, the coating is applied on a substrate, and the substrate can be a glass, a glass ceramic, a ceramic, a metal, an enamel and/or a plastic material.

The substrates can be transparent, semi-transparent, or non-transparent. In particular, according to another embodiment of the invention, the layer comprising the catalytically active material of the present invention may as well be applied to substrates which are entirely or partly provided with decorative layers, semi-transparent layers, barrier layers, adhesion-promoting layers or other functional layers such as electrically conductive layers or thermo-, electro- or magneto-chromic layers. Thus, according to this embodiment of the invention at least one further layer is applied between the substrate and the coating.

According to another embodiment of the invention the layer may as well be applied on a mixed layer including a plurality of oxides, for example $TiO_2$ and $SiO_2$, or $ZrO_2$ and $SiO_2$. This layer preferably has a refractive index from 1.65 to 1.83 at a wavelength of 589 nm and has a layer thickness between at least 20 and at most 150 nm. This mixed layer has the task of minimizing visual conspicuousness of the layer made of the catalytically active material according to the present invention. The need for this may arise because of the relatively high reflectance of a layer made of the catalytically active material according to the present invention, and for instance in case of transparent glass ceramics this may be very advantageous.

According to yet another embodiment of the invention, the layer is applied on a glass ceramic substrate, preferably a transparent glass ceramic which has a glassy zone with a thickness in a range from 50 nm to 10 μm, preferably from 200 nm to 2000 nm, as is known in the art.

A glass or glass ceramic substrate suitable for the invention comprises one or more of the elements Si, O, Na, Zr, Ca, Ti, Mg, Nb, B, Sr, La, and/or Li.

According to a further embodiment of the invention, the coating has a thickness of at least 5 nm and at most 100 nm, preferably of at least 10 nm and at most 90 nm.

Preferably in this case the coating exhibits a transmittance of greater than 80%, preferably greater than 85%, and more preferably greater than 88% for electromagnetic radiation in the range from 380 to 780 nm.

According to a further embodiment of the invention, the coating comprises, besides the catalytically active material, one or more components selected from the group consisting of Si, Al, Na, Li, Sr, B, P, Sb, Ti, F, and/or $MgF_2$, and/or $CaF_2$.

According to yet another embodiment of the invention, the coating further comprises inorganic amorphous and/or crystalline nanoparticles, preferably oxidic nanoparticles having a mean diameter from 4 to 30 nm.

Embodiments in which the coating comprises further constituents in addition to the catalytically active material made of a mixed oxide, for example oxide or fluoride nanoparticles, are particularly preferred in case the coating should not only have a catalytic effect, but should also have additional properties, for example hydrophobic behavior.

Furthermore, the present invention discloses an article consisting of a substrate and at least one coating applied thereon which is made of a catalytically active material according to the present invention, wherein the article is a viewing window or an inner lining and wherein furthermore, in operation, the article is exposed to a high temperature load of up to 700° C.

In a further embodiment of the invention the catalytically active material is embedded in a glassy matrix. If a layer is produced from such a composite material, the advantage resulting therefrom is that a kind of glass ceramic coating with approximately zero expansion is produced. This avoids stresses at the boundary surface between layer and substrate and also between different layers. This embodiment of the invention is moreover particularly suitable for coating glass ceramic substrates which are used for cooktops or fireplace windows, for example.

Furthermore, the present invention discloses a method for creating a material structure of a catalytically active material comprising a mixed oxide including a first metal selected from group 4 of the periodic table of elements, and/or a second metal, and at least one further metal selected from group 11 of the periodic table of elements, the method comprising the steps of: separating the starting substances so that they are released from their solid-state association to be provided in form of reactive particles in a surrounding fluid; solvating the reactive particles by at least one component of the fluid surrounding the particles so that the particles are provided in form of a solvated complex; and preferably generating a potential gradient between the fluid and a support so that the solvated reactive particles reactively join together on the support to form a material mixed at a molecular level so as to form a mixed oxide.

In the context of the present invention, support generally refers to a means on which a material can be deposited. For example, such a support may be in the form of a carrier which is a porous substantially inert material that is intended to be functionalized merely on its surface. It is also possible that the support is in the form of a substrate, that is to say that during creation of a material structure a full-surface coating is deposited on a surface and furthermore an adhesive and/or cohesive bond is created between the material and the substrate so that a functional coating is obtained on the support or the substrate in this case. Supports in this sense are sheets, for example, in particular glass or glass ceramic sheets. However, it is as well possible that the support only provides a suitable surface on which a material can be deposited and that there is no specific further bond between the deposited material and the substrate. The walls of a reaction vessel may be considered as a support within the meaning of the present invention, for example.

In the context of the present invention, a potential gradient generally refers to a difference in the energy between at least two reactants, and therefore also between the reactive particles solvated in the fluid on the one hand and the support, for example a substrate, on the other hand.

By way of example, such a potential gradient may be produced by applying an electrical voltage, such as employed during sputtering, for example, where the particles absorb the energy gained by the ions when passing through the electrical potential gradient, which energy can be transferred to reactants in the fluid, for example during chemical reactions. In this way as well, the energy gained from the potential gradient is introduced into the fluid and acts between the fluid and the respective support in such a way that the solvated reactive particles reactively join together on the support to form a material mixed on a molecular level so that a mixed oxide is formed.

Generally and without being limited to the application of an electrical voltage, the term 'potential gradient' has therefore to be understood as an energetic potential gradient.

The terms 'chemical potential' and 'chemical potential gradient' are in particular also encompassed herein. The chemical potential of a substance may be considered as a measure for the extent to which the substance under consideration is able to react and also to transition from one aggregate state to another, for example.

The term 'chemical potential' also encompasses the term 'electrochemical potential' which is relevant for the consideration of ions or, more generally, charged particles in an electrical field, for example.

Since in this sense each potential gradient describes the ability of a system to emit or absorb energy, the potential gradient, such as an electrochemical potential gradient, is therefore a measure for the extent to which reactions can proceed between the components of the system for which this energy from the potential gradient is made available, for example.

Furthermore, the term potential also encompasses the so-called zeta potential which is also referred to as electrokinetic potential. This is particularly relevant when considering the deposition of charged particles and/or solvated ions on a solid, for example a support. In order for the particles and/or ions to become attached on the substrate, for example by adsorption, the zeta potential must assume a non-zero value. Adjustment of this potential gradient is usually achieved by controlling the pH value. In this case, the potential gradient expressed as a zeta value provides the particles with sufficient energy to adhere to the support. During processing involving a coating fluid, the potential gradient may furthermore be achieved by a change in the concentration of the particles in the fluid, for example by an increase of the concentration due to evaporation of at least one solvent.

In the context of the present disclosure, solvating refers to the process in which the substances included in a fluid, for example in a solvent or a mixture of solvents, are becoming surrounded by the molecules of at least one constituent of the fluid, such as a solvent, so that a solvate shell comprising the molecules of at least one constituent of the fluid is formed around the particles of the substances, such as ions, atoms, or clusters of ions or atoms. Such a solvent shell stabilizes the particle in the respective fluid. More generally, however, without being limited to solvating in a liquid mixture, such solvating in the sense of the present invention may as well proceed in a gas mixture, for example in a reactive gas mixture, and also in a plasma, when ions are surrounded by the components of the reactive gas mixture or of the plasma. Thus, for the purposes of the present disclosure, the term 'fluid' not only encompasses liquids and gases, but also plasmas.

In summary, generation of a potential difference and therefore of a potential gradient refers to the generation of an energy difference between the particles solvated in a fluid and a support, which may be achieved by applying an electrical voltage, but also by controlling the pH value of a solution, for example by buffering the pH value. Other options for generating a potential gradient include changing the concentration in the solution, for example by evaporation of a solvent, as occurring in a drawing process during drawing or during a spraying process, for example.

According to a further embodiment of the invention, a post-treatment step is performed once the material structure has been successfully created, so that adhesion between the material and the substrate is adjusted. By way of example such a post-treatment step comprises thermal post-treatment such as drying and/or sintering.

In the context of the present invention, drying refers to a thermal post-treatment which proceeds at a rather low temperature, i.e. at temperatures of 250° C. or less. At these temperatures no chemical reactions will usually take place, rather a predominantly physical reaction will be caused such as the evaporation of solvents.

Sintering refers to a process in which chemical reactions are resulting as well, for example bonding between the deposited material and a support on which the material was deposited. Such reactions will usually take place at a temperature of 300° C. and more.

According to a further embodiment of the invention, the material structure is produced by a vapor phase deposition method such as sputtering, flame pyrolysis, PECVD, or APCVD, or by a liquid phase deposition method such as a sol-gel process, preferably a roll coating method, a printing method such as pad printing, or inkjet printing or screen printing, or spraying, or dipping.

If the catalytically active material of the present invention is applied as a coating using a vapor phase coating process, pulsed medium-frequency sputtering is preferred.

According to a further embodiment of the invention, a further adhesion promoting layer and/or a barrier layer consisting of $SiO_2$ or a mixed oxide, for example, is located below the layer. This layer may also be produced by a liquid phase deposition method, or by segregation from the substrate, if the substrate is a glass or a glass ceramic. Also, the adhesion promoting layer may be applied using chemical vapor deposition (CVD), sputtering, or flame pyrolysis.

If the creating of a material structure is achieved by sputtering, the potential gradient is generated by applying a voltage. If the creating of a material structure is achieved in a liquid phase process, the potential gradient is preferably produced by changing the concentration of the particles in a coating fluid, for example by evaporation.

Solvents that are preferably employed for screen printable coating solutions are solvents having a vapor pressure of less than 10 bar, in particular less than 5 bar, and especially less than 1 bar. Possible solvents which are suitable alone or in combination include for example water, n-butyl acetate, methoxybutyl acetate, butyldiglycol, butyldiglycol acetate, cyclohexane, diacetone alcohol, ethylene glycol, diethylene glycol, ethylene glycol monoethyl ether, ethylene glycol monopropyl ether, diethylene glycol monoethyl ether, dipropylene glycol monomethyl ether, dipropylene glycol monobutyl ether, propylene glycol monobutyl ether, propylene glycol monopropyl ether, propylene glycol monoethyl ether, ethoxypropyl acetate, polyethylene glycol 400, hexanol, methoxy propyl acetate, monoethylene glycol, ethylpyrrolidone, methylpyrrolidone, dipropylene glycol dimethyl ether, propylene glycol, propylene glycol monomethyl ether, terpineol (both as an isomeric mixture and the individual isomers in pure form as well), and tripropylene glycol monomethyl ether.

In order to be able to adjust a desired viscosity, appropriate organic and/or inorganic additives can be used. Organic additives include, for example, hydroxyethyl cellulose and/or hydroxypropyl cellulose and/or xanthan gum and/or polyvinyl alcohol and/or polyethylene alcohol and/or polyethylene glycol, block copolymers and/or triblock copolymers and/or tree resins and/or polyacrylates and/or polymethacrylates.

The invention will now be further explained by way of examples.

Example 1

A solution for the preparation of a mixed oxide of zirconium and copper is prepared as follows:

In a round bottom flask, 0.15 mole of acetylacetone is added dropwise under stirring to 0.15 mole of a solution of 70 wt % of zirconium-n-propoxide in 1-propanol. This causes significant warming of the reaction solution. The resulting reaction mixture is stirred for 60 minutes at room temperature and then hydrolyzed with 0.45 mole of water. Now, 0.15 mole of copper(II) chloride dihydrate is added to the pre-hydrolysate and the salt is dissolved therein under stirring. By adding ethanol, a coating solution is obtained which has a solids concentration of 6 wt %. In this case, the metals contained in the solution were isolated as starting substances in such a manner that they were released from their solid body association so as to be provided as reactive particles in the fluid surrounding them.

Example 2

Preparation of a Mixed Oxide Coating from Zirconium and Copper.

On a cleaned transparent borosilicate glass, a transparent well-wetting wet film consisting of the solution of implementation example 1 is applied by dip coating with a drawing speed of 60 cm/min. By thermal post-treatment of the wet film for one hour at 450° C. a transparent abrasion-resistant and temperature-stable coating is formed, which has thermo-catalytic properties, in particular exhibits thermo-catalytic activity already at temperatures below 300° C., and moreover is free of cracks.

In the liquid coating process described, the potential gradient is therefore influenced, in particular generated, by changing the concentration of the particles in a coating fluid, for example by evaporation.

Example 3

A solution for the preparation of a mixed oxide of cerium and copper is prepared as follows:

In a round bottom flask, 0.3 mole of cerium(III) chloride heptahydrate are dissolved in 72 ml of ethanol under vigorous stirring. The resulting reaction mixture is stirred for 60 minutes at 80° C. with reflux and then hydrolyzed with 0.9 mole of water. In the next step, 0.1 mole of copper(II) chloride dihydrate is added to the pre-hydrolysate and dissolved under stirring. Furthermore, a high-boiling solvent in the form of diethylene glycol monoethyl ether is added to the resulting solution. Low-boiling ethanol is removed using a rotary evaporator. Furthermore, triethanolamine and a thickening agent in the form of hydroxypropyl cellulose are added to the solution. The resulting coating solution has a total solids content of 6 wt % and a thickening agent content of 4 wt %. The solvent consists of a mixture of 90 wt % diethylene glycol monoethyl ether and 10 wt % of triethanolamine.

Example 4

Preparation of a Mixed Oxide Coating from Copper and Cerium.

Coatings with a wet film thickness from 2 to 4 μm of the solution of implementation example 3 are applied on a glass ceramic substrate by screen printing. After drying at 200° C., a xerogel film thickness from 200 to 400 nm is obtained. Subsequently, a further thermal post-treatment of the coated substrate is performed at 500° C. for a period of one hour, so that a transparent abrasion-resistant temperature-stable coating is obtained which is free of cracks and moreover is thermo-catalytically active.

In the liquid coating process described, the potential gradient is therefore influenced, in particular generated, by changing the concentration of the particles in a coating fluid, for example by evaporation.

Example 5

A solution for producing a mixed oxide from cerium, zirconium, and copper is prepared as follows:

In a round bottom flask, 0.15 mole of acetylacetone is added dropwise under stirring to 0.15 mole of a solution of 70 wt % of zirconium-n-propoxide in 1-propanol, thereby causing significant warming of the reaction solution. The resulting reaction mixture is stirred for 60 minutes at room temperature and then hydrolyzed with 0.45 mole of water. Now, 0.6 mole of cerium(III) chloride heptahydrate and 0.25 mole of copper(II) chloride dihydrate are added to the pre-hydrolysate and dissolved therein under stirring. Furthermore, ethanol and pentanediol are added to the solution as solvents. The resulting solution has a solids content of 6 wt %. The solvent consists of 95 wt % of ethanol and 5 wt % of pentanediol.

Example 6

Preparation of a Mixed Oxide Coating from Zirconium, Cerium and Copper.

On a cleaned transparent borosilicate glass, a transparent well-wetting wet film consisting of the solution of implementation example 5 is applied by dip coating with a drawing speed of 60 cm/min. By thermal post-treatment of the wet film for one hour at 450° C. a transparent abrasion-resistant and temperature-stable coating is formed, which has thermo-catalytic properties, in particular exhibits thermo-catalytic activity already at temperatures below 300° C., and moreover is free of cracks.

In the liquid coating process described, the potential gradient is therefore influenced, in particular generated, by changing the concentration of the particles in a coating fluid, for example by evaporation.

Example 7

Producing a Fireplace Window with a Mixed Oxide Coating from Cerium and Copper by Vapor Deposition A metallic copper target and a metallic cerium target are arranged together in a magnetron-based co-sputtering coating apparatus in such a manner that the two plasma clouds overlap and a substrate can be placed at different positions.

With this arrangement it is possible to deposit different alloys with different contents of copper and cerium on the substrate. When supplying oxygen, a film composition of $Cu_yO_x:CeO_z$ is obtained, the exact composition thereof depending on the position of the substrate with respect to the two sputter material sources and on the sputtering power of the individual sources.

For producing a coating according to the invention, the substrate is positioned in the geometric center between the two sputter material sources and an identical power of 4 kW is preset for the two sources, so that a comparable content of copper and cerium is obtained in the coating. The thermo-catalytical effect may be optimized by varying parameters such as pressure, temperature, operating point and plasma pulsing. Glass and glass ceramic substrates are employed as substrates. A substrate coated by this method is installed in a fireplace stove in a manner so that the coating faces the stove chamber.

During sputtering, an electrical voltage is applied between the target and the substrate, which voltage can be a DC voltage, an alternating voltage, or a mixed voltage.

Thus, in this implementation example a potential gradient is generated by applying an electrical voltage during a sputtering process.

Example 8

The coatings applied to a substrate are tested as follows:

For assessing the thermo-catalytic decomposition of carbonaceous combustion products, a contamination of coked rosin is deposited on the coatings. For this purpose, an ethanolic rosin solution is sprayed onto the coated substrate. For preparing the rosin contamination, a supersaturated solution is prepared from 15 g of rosin and 30 ml of ethanol. After stirring for 30 minutes, it is diluted with three parts of ethanol. The so-coated sheets are baked in an oven for one hour at 350° C., resulting in an opaque contamination of the sheet consisting of carbonaceous organic combustion products.

Then the samples are annealed at temperatures from 250 to 550° C. Preferably, the test is performed in the range from 250 to 550° C. with a stepwise increase in temperature by 50° C. with a holding time of one hour at the respective temperature. After each temperature exposure, the samples are cooled and visually evaluated.

In case of non-coated glass or glass ceramic sheets, complete decomposition of carbonaceous organic contamination occurs at 550° C. This is a pyrolytic decomposition of the organic constituents. All surfaces mentioned in the implementation examples exhibit significantly better and earlier decomposition of rosin contamination. In particular, with optimized coatings decomposition was demonstrated already at 260° C.

Example 9

Furthermore it is possible to obtain catalytically active powders from the solutions prepared in implementation examples 1, 3, and 5, by evaporation of the solvent and subsequent thermal treatment, e.g. at 500° C., or for SOL450 TC at 450° C. and for SOL650 TC at 650° C., and the catalytic activity of these powders can be measured by thermogravimetric analysis. For this purpose, the catalyst powder is mixed with a standard soot (Printex U from Evonik) which represents a carbonaceous organic combustion product by way of example, using a mortar. Subsequently, the sample is measured on a thermobalance where it is heated with a predefined heating rate and the associated weight loss is determined. In this manner it can be determined at which temperature the soot decomposes, in combination with and without catalyst powder.

In the described method for producing catalytically active powders, the potential gradient is therefore influenced, in particular generated, by changing the concentration of the particles in a coating fluid.

DETAILED DESCRIPTION

Figure 1:
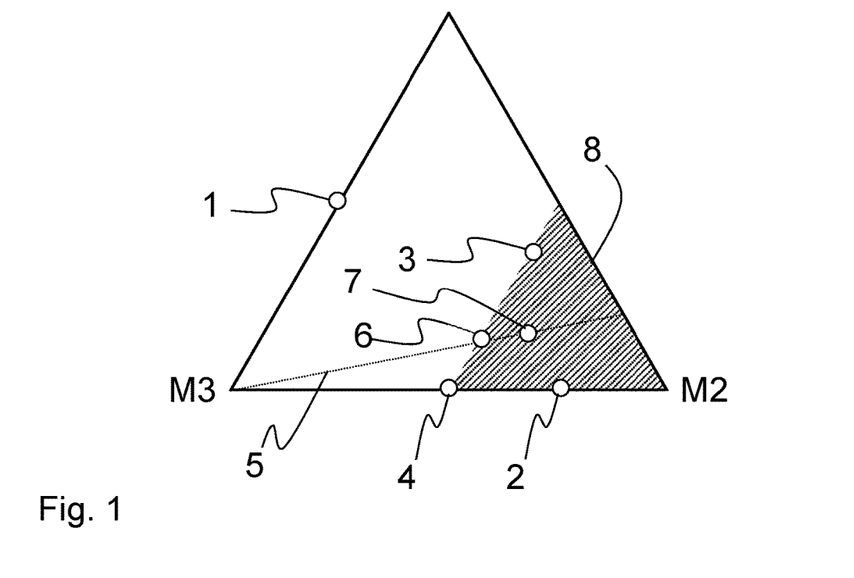
FIG. 1 schematically shows a ternary diagram of materials, in which compositions according to the invention are indicated.

FIG. 1 schematically shows a ternary diagram of materials, in which compositions of the catalytically active material according to the present invention are indicated as a function of the metals or cations contained in the material. It is favorable in this case to solely consider the relevant content of metals, since in an oxidation catalyst the oxygen content usually is not equal to the precise stoichiometric content which is obtained by calculation with the assumption of specific oxidation states. However, this is why it is not possible to accurately indicate the molar ratios of specific metal oxides in such a catalytically active material.

At each of the vertices of the triangle, the respective designated material is present as the only metal or as the only cation in the corresponding oxidic compound. At the edges of the triangle, the composition varies between two respective metals, for example between M3 and M2 at the base of the triangle. Compositions containing all three metals are located in the area of the illustrated triangle.

Furthermore in FIG. 1, the approximate location of a composition 1 of a catalytically active material according to the present invention is indicated, which in terms of the atomic content of metals includes equal fractions of the metal M1 and the metal M3. The ratio $V_{M,atomic}$ of M3 to the sum of metals M1 and M2 is therefore 1 in this case. If zirconium is used as the metal M1 and copper as the metal M3, a composition is obtained which corresponds to the coating solution of implementation example 1, or to the composition of the coating of implementation example 2. However, generally, without being limited to the example discussed herein it is also possible that not a single pure metal is used as M1, but rather a mixture of two suitable metals M1. In addition to or instead of zirconium, for example, hafnium or titanium could be used. In such a case, the respective atomic contents would add up, that is the content of M1 would be composed of the sum of the contents of titanium, zirconium, and/or hafnium.

Furthermore, the approximate location of a compositions 2 of a catalytically active material according to the present invention is indicated, which only comprises a metal M2 and a metal M3. In this example, the content of metal M3 only amounts to one part, and that of metal M2 to three parts. Thus, the ratio $V_{M,atomic}$ has a value of 1:3. If cerium is used as the only metal M2 and copper as the only metal M3, a composition of the catalytically active material is obtained which corresponds to the solution of implementation example 3 or to the composition of the coating according to implementation example 4, respectively. However, similarly as with metal M1 it is also possible that a plurality of metals M2 are contained in the catalytically active material of the present invention, and in this case, again, the respective atomic contents would add up, i.e. M2 would be composed of the sum of the contents of the individual metals M2.

Furthermore, the approximate location of a composition 3 is indicated, which includes 3 parts of M1 and additionally three parts of M2 and one part of M3. Here, a ratio $V_{M,atomic}$ of 1:6 is resulting. If only zirconium is used as M1, only cerium as the metal M2, and furthermore copper as the metal M3, a composition is obtained which corresponds to the composition of implementation example 5 or to the coating of implementation example 6, respectively.

Also indicated is the approximate location of a composition 4 of a catalytically active material of the present invention. In this case, the catalytically active material has a ratio $V_{M,atomic}$ of 1, i.e. equal parts of M2 and M3 are included. If cerium and copper are used as M2 and M3, respectively, this corresponds to the composition of implementation example 7.

Particularly preferred are compositions of the catalytically active material in which the ratio of M1 to M2 is 1:4. Such compositions are located on a section line through the ternary space, which is indicated as a straight line 5 in the diagram of FIG. 1. The approximate locations of such preferred compositions 6 and 7 are also indicated in the ternary diagram. In terms of its atomic composition, composition 6 includes a content of one part of M1, four parts of M2, and 3 parts of M3. Thus, the ratio $V_{M,atomic}$ resulting therefrom is 3:(1+4), or 1:1.667. If zirconium is used as M1, cerium as M2, and copper as M3, a macroscopic composition 6 or chemical formula of the catalytically active material of $Cu_3Ce_4ZrO_x$ is obtained, with an oxygen content that cannot be accurately determined due to varying valences. Furthermore, composition 7 includes 3 parts of M1, 12 parts of M2, and 5 parts of M3. The ratio $V_{M,atomic}$ resulting therefrom is 5:(12+3), or 1:3. If zirconium is used as M1, cerium as M2, and copper as M3, a macroscopic composition 7 or chemical formula of the catalytically active material of $Cu_5Ce_{12}Zr_3O_y$ is obtained, with an oxygen content that cannot be accurately determined due to varying valences, similarly as in case of composition 6. Catalytically active materials having a ratio $V_{M,atomic}$ of 1:3 and in which furthermore the ratio of M1 to M2 is 1:4 are preferred herein. Particularly preferred is a catalytically active material in which the metals zirconium, cerium, and copper are included in an atomic ratio of 3 to 12 to 5 and which has the chemical formula $Cu_5Ce_{12}Zr_3O_y$, with an oxygen content that cannot be precisely specified because of changing valences.

Without being limited to the implementation examples described herein, it has been generally been found that compositions exhibiting a particularly high catalytic activity are located in the sub-portion 8 of the ternary system consisting of materials M1, M2, and M3, although compositions that include only M1 and M2, i.e. which are located in the region of the binary system of M1 and M2 that is limiting the ternary system, do not represent compositions according to the invention. However, already slight doping with a metal M3, e.g. copper, provides a catalytically active material.

Figure 2:
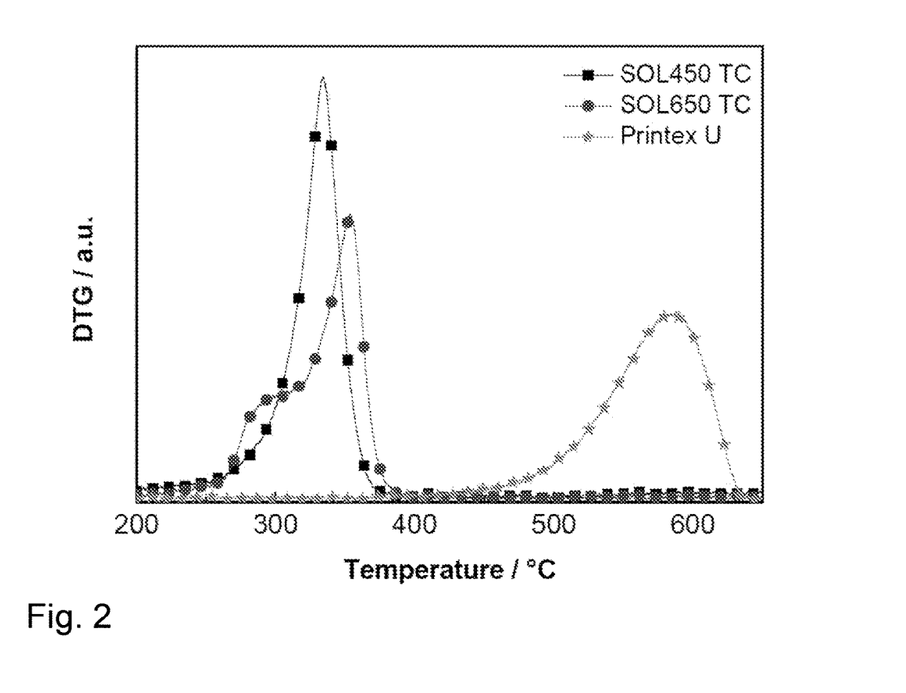
FIG. 2 shows a diagram of differential thermogravimetric measurements relating to the oxidative decomposition of soot on different coatings and on a non-coated reference sample.

FIG. 2 shows the behavior of differently synthesized powder samples in the degradation of a carbonaceous organic compound, in this case soot "Printex U" by way of example, for a composition of a catalytically active material that corresponds to the composition 7 of FIG. 1, i.e. which has a chemical formula of $Cu_5Ce_{12}Zr_3O_y$.

Powder samples "SOL450 TC" and "SOL650 TC" were produced as described under implementation example 9 and were sintered at 450° C. and 650° C., respectively.

With these powder samples, a measurable catalytic effect arises starting at a temperature of about 260° C. (sample SOL650 TC) and about 280° C. (SOL450 TC), respectively. As can be seen in FIG. 2, this catalytic effect can be determined by differential thermogravimetry and is evident by an increase in the differential thermogravimetric graph (DTG). Furthermore it can be seen that the soot is completely decomposed already at a temperature of about 375° C. (sample SOL450 TC) and of about 390° C. (sample SOL650 TC), respectively. If, by contrast, soot is subjected to such differential thermogravimetry without the addition of a catalytically active material according to the invention (see curve "Printex U"), the soot begins to decompose to any significant extent only starting at about 475° C. Complete decomposition of the carbonaceous combustion products occurs at a temperature of 640° C. Thus, with a catalytic material of the invention the temperature for complete decomposition of soot is reduced by about 250° C.

So, in the context of the present invention catalytic activity means that the oxidative decomposition of soot or of carbonaceous organic combustion products begins. Catalytic activity of the material is therefore defined as the start of oxidative decomposition of organic carbonaceous combustion products, such as soot.

On a sheet provided with a coating, for example a glass or glass ceramic sheet, the effect will occur in the same temperature range. This can be measured, for example, by placing a coated sheet contaminated with carbonaceous organic combustion products in an oven under a defined temperature, and by comparing the optical transmittance of the coated but uncontaminated sheet with that of the sheet contaminated with carbonaceous organic combustion products and then treated in the oven.

Further evidence of the catalytic activity of the catalytically active material of the invention is obtained when installing a sheet coated with the material of the invention in a furnace and performing combustion under reduced oxygen supply. In this case, the sheet will become strongly covered by carbonaceous organic combustion products to exhibit what is known as "sooting".

Subsequently, the furnace is operated under "normal" conditions, i.e. with sufficient supply of oxygen, and the temperature at the sheet is recorded using a thermal imaging camera. Now it can be determined, again by a measurement of transmittance, whether the original transparence could be restored by the catalytic decomposition of the contamination.

However, these effects can be verified on a purely visual basis as well. After the decomposition of the soot, the powder will again be in the form of its original color and it will be possible to look through the sheet again.

Figure 3:
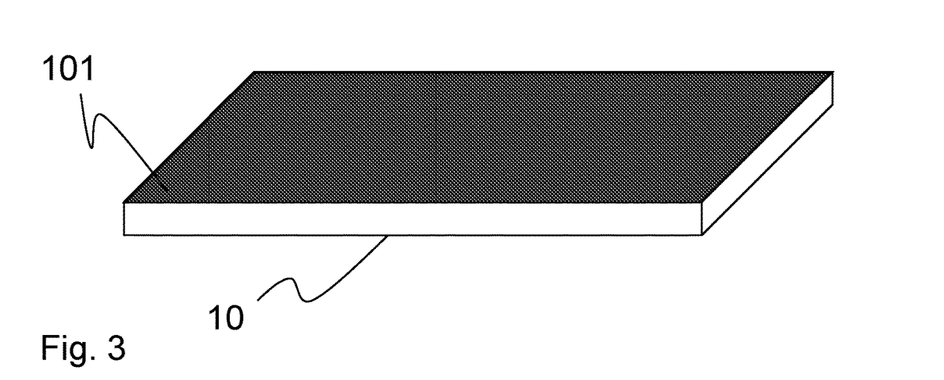
FIG. 3 shows an article having a coating of a catalytically active material according to the invention.

FIG. 3 shows an inventive article 10 that has a coating 101 made of a catalytically active material according to the present invention. Article 10 consists of a substrate which may be a glass, glass ceramic, ceramic, metal, enamel, and/or a plastic substrate, for example. The coating preferably has a thickness of at least 5 nm and at most 100 nm, preferably of at least 10 nm and at most 90 nm. Furthermore preferably, the coating exhibits a transmittance in a range of greater than 80%, preferably greater than 85%, and more preferably greater than 88% for electromagnetic radiation in the range from 380 to 780 nm. Furthermore preferably, the refractive index of the coating at a wavelength of 589 nm is from 1.7 to 2.2, preferably from 1.8 to 2.1.

According to another embodiment of the invention, in addition to the catalytically active material, such a coating may furthermore include one or more components selected from the group consisting of Si, Al, Na, Li, Sr, B, P, Sb, Ti, F, and/or MgF$_2$, and/or CaF$_2$, and alternatively or additionally inorganic amorphous and/or crystalline nanoparticles, preferably oxidic nanoparticles having a mean diameter from 4 nm to 30 nm.

Preferably, such an article 10 is formed as a viewing window or an inner lining, for example as a viewing window for an oven or another cooking appliance, or as a viewing window for a fireplace or another stove, or as an inner lining for an oven or furnace or for exhaust pipes or chimneys. The article 10 is therefore an article which is exposed to a high temperature load of up to 700° C. in operation.

Preferably, such a material is produced by a method for creating a material structure from a fluid phase on a support, comprising the steps of: separating the starting substances so that they are released from their solid-state association to be provided in the form of reactive particles in a surrounding fluid; solvating the reactive particles by at least one component of the fluid surrounding the particles so that the particles are provided in the form of a solvated complex; and preferably generating a potential gradient between the fluid and a support so that the solvated reactive particles reactively join together on the support to form a material mixed at a molecular level so as to form a mixed oxide.

According to another embodiment of the invention, the creation of a material structure may be followed by a post-treatment step so as to adjust adhesion between the material and the support, preferably a thermal post-treatment such as in the form of drying and/or sintering.

LIST OF REFERENCE NUMERALS

M1 Metal, preferably present in oxidation state +4 in compounds
M2 Metal, preferably present in oxidation state +4 in oxides
M3 Metal, selected from group 11 of the periodic table of elements
1 Composition of a catalytically active material including M1 and M3
2, 4 Composition of a catalytically active material including M2 and M3
3, 6, 7 Composition of a catalytically active material including M1, M2, and M3
Preferred composition range of the ternary system of materials M1, M2, and M3
Exactly a ratio M1:M2 of 1:4 in the ternary system of materials M1, M2 and M3
10 Article with catalytically active coating
101 Catalytically active coating

What is claimed is:
1. A mixed oxide catalytically active material, comprising:
a first metal (M1) selected from group 4 of the periodic table of elements and/or a second metal (M2);
a third metal (M3) selected from group 11 of the periodic table of elements, wherein each of the first and/or second and third metals (M1, M2, M3) is present at an oxidation state greater than 0 and mixed at a molecular level so that a macroscopic composition given by the chemical formula of the material corresponds to the composition of the material at the molecular level;
a catalytic activity that occurs at temperatures below 300° C., wherein the catalytic activity is defined as a start of oxidative decomposition of organic carbonaceous combustion products;
a ratio $V_{M,atomic}$ of a content of the third metal (M3) to a sum of contents of the other metals (M1, M2) based on the atomic composition,

$$V_{M,atomic} = \frac{M3}{\sum (M1 + M2)},$$

is between 1 and 1:6; and
a temperature resistance of at least 600° C.
2. The catalytically active material of claim 1, wherein the ratio $V_{M,atomic}$ is between 1 and 1:3.
3. The catalytically active material of claim 1, wherein the first metal (M1) comprises titanium and/or zirconium.
4. The catalytically active material of claim 1, wherein the second metal (M2) comprises a lanthanide.
5. The catalytically active material of claim 1, wherein the second metal (M2) comprises cerium.
6. The catalytically active material of claim 1, wherein the third metal (M3) is copper.
7. The catalytically active material of claim 1, further comprising an atomic ratio of the first metal (M1) to the second metal (M2) of 1:4.
8. The catalytically active material of claim 1, further comprising a porosity of less than 25 vol %.
9. The catalytically active material of claim 1, further comprising a refractive index between 1.7 and 2.2 at a wavelength of 589 nm.
10. A coating made of the catalytically active material of claim 1.
11. The coating of claim 10, comprising a transmittance of greater than 80% for electromagnetic radiation in a range from 380 to 780 nm.
12. The coating of claim 10, further comprising one or more components selected from the group consisting of Si, Al, Na, Li, Sr, B, P, Sb, Ti, F, MgF$_2$, CaF$_2$, and combinations thereof.
13. The coating of claim 10, further comprising inorganic amorphous and/or crystalline nanoparticles.
14. The coating of claim 10, further comprising oxidic nanoparticles having a mean diameter from 4 nm to 30 nm.
15. A mixed oxide catalytically active material, comprising:
a first metal (M1) selected from group 4 of the periodic table of elements and/or a second metal (M2);
a third metal (M3) selected from group 11 of the periodic table of elements, wherein each of the first and/or second and third metals (M1, M2, M3) is present at an oxidation state greater than 0 and mixed at a molecular level so that a macroscopic composition given by the chemical formula of the material corresponds to the composition of the material at the molecular level;
a catalytic activity that occurs at temperatures below 300° C., wherein the catalytic activity is defined as a start of oxidative decomposition of organic carbonaceous combustion products;
a ratio $V_{M,atomic}$ of a content of the third metal (M3) to a sum of contents of the other metals (M1, M2) based on the atomic composition, $$V_{M,atomic} = \frac{M3}{\sum (M1 + M2)},$$

is between 1 and 1:6; and
at least in part, a nanocrystalline fraction, wherein the nanocrystalline fraction is greater than 25 vol %.

16. The catalytically active material of claim 15, wherein the nanocrystalline fraction comprises nanocrystals having a crystallite size from 4 to 50 nm, wherein the crystallite size is specified as a mean diameter of the crystallites.

17. The catalytically active material of claim 15, further comprising a granular structure in which nanocrystals of the nanocrystalline fraction do not have a preferred orientation so that the nanocrystals are randomly distributed.

18. A mixed oxide catalytically active material, comprising:
a first metal (M1) selected from group 4 of the periodic table of elements and/or a second metal (M2), the second metal (M2) comprising a lanthanide;
a third metal (M3) selected from group 11 of the periodic table of elements, wherein each of the first and/or second and third metals (M1, M2, M3) is present at an oxidation state greater than 0 and mixed at a molecular level so that a macroscopic composition given by the chemical formula of the material corresponds to the composition of the material at the molecular level;
a catalytic activity that occurs at temperatures below 300° C., wherein the catalytic activity is defined as a start of oxidative decomposition of organic carbonaceous combustion products;
a ratio $V_{M,atomic}$ of a content of the third metal (M3) to a sum of contents of the other metals (M1, M2) based on the atomic composition, $$V_{M,atomic} = \frac{M3}{\sum(M1+M2)},$$

is between 1 and 1:6; and
a refractive index between 1.7 and 2.2 at a wavelength of 589 nm.

19. A coated article comprising:
a substrate made of a material selected from the group consisting of glass, glass ceramic, ceramic, metal, enamel, and plastic; and
a coating made of the catalytically active material of claim 1 on the substrate.

20. The coated article of claim 19, wherein the coating a thickness of at least 5 nm and at most 100 nm.

21. The coated article of claim 19, further comprising at least one layer applied between the substrate and the coating.

22. The coated article of claim 19, wherein the substrate is a transparent glass ceramic.

23. The coated article of claim 22, wherein the transparent glass ceramic has a glassy zone of a thickness in a range from 50 nm to 10 μm.

24. The coat coated article of claim 22, wherein the glass ceramic comprises an element selected from the group consisting of Si, O, Na, Zr, Ca, Ti, Mg, Nb, B, Sr, La, Li, and combinations thereof.

25. The coated article of claim 19, wherein the coating comprises the catalytically active material embedded in a glassy matrix.

26. A mixed oxide catalytically active material, comprising:
a first metal (M1) selected from group 4 of the periodic table of elements and/or a second metal (M2);
a third metal (M3) selected from group 11 of the periodic table of elements, wherein each of the first and/or second and third metals (M1, M2, M3) is present at an oxidation state greater than 0 and mixed at a molecular level so that a macroscopic composition given by the chemical formula of the material corresponds to the composition of the material at the molecular level;
a catalytic activity that occurs at temperatures below 300° C., wherein the catalytic activity is defined as a start of oxidative decomposition of organic carbonaceous combustion products;
a ratio $V_{M,atomic}$ of a content of the third metal (M3) to a sum of contents of the other metals (M1, M2) based on the atomic composition, $$V_{M,atomic} = \frac{M3}{\sum(M1+M2)},$$

is between 1 and 1:6, and
one of a temperature resistance of at least 600° C., a porosity of less than 25 vol %, and a refractive index between 1.7 and 2.2 at a wavelength of 589 nm.

27. A coated article comprising:
a transparent substrate made of a material selected from the group consisting of glass, glass ceramic, ceramic, metal, enamel, and plastic;
a transparent coating made of a mixed oxide catalytically active material on the substrate, the mixed oxide catalytically active material comprising:
a first metal (M1) selected from group 4 of the periodic table of elements and/or a second metal (M2);
a third metal (M3) selected from group 11 of the periodic table of elements, wherein each of the first and/or second and third metals (M1, M2, M3) is present at an oxidation state greater than 0 and mixed at a molecular level so that a macroscopic composition given by the chemical formula of the material corresponds to the composition of the material at the molecular level;
a catalytic activity that occurs at temperatures below 300° C., wherein the catalytic activity is defined as a start of oxidative decomposition of organic carbonaceous combustion products; and
a ratio $V_{M,atomic}$ of a content of the third metal (M3) to a sum of contents of the other metals (M1, M2) based on the atomic composition, $$V_{M,atomic} = \frac{M3}{\sum(M1+M2)},$$

is between 1 and 1:6.

28. The coated article of claim 27, further comprising at least one decorative layer applied between the transparent substrate and the transparent coating.

* * * * *